O. E. G. OLMSTED.
NUT LOCK.
APPLICATION FILED JULY 29, 1920. RENEWED APR. 12, 1921.
1,379,473.
Patented May 24, 1921.
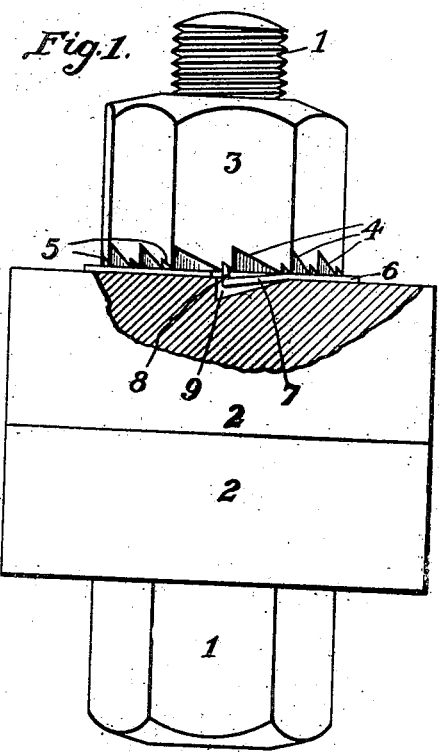
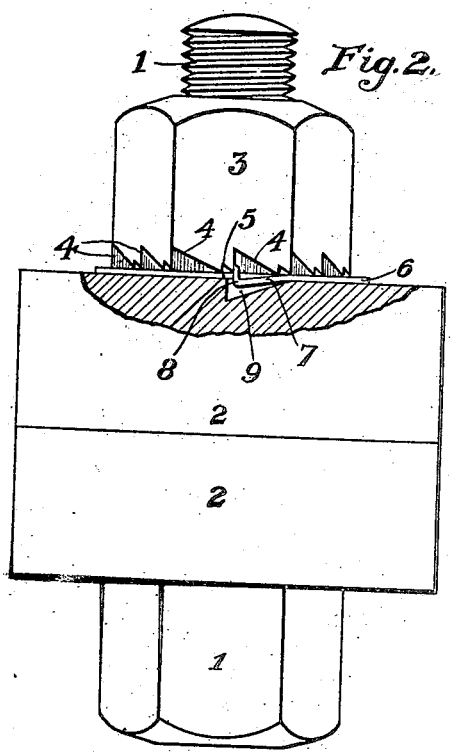
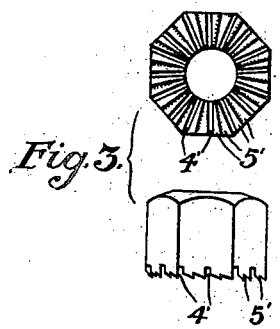
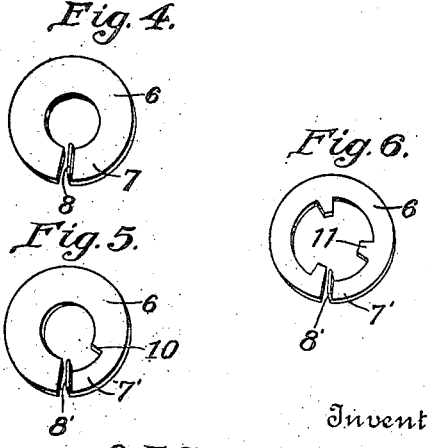
Inventor
O. E. G. OLMSTED
By Mason Fenwick & Lawrence
Attorneys.

UNITED STATES PATENT OFFICE.

ORRIN E. G. OLMSTED, OF DENVER, COLORADO.

NUT-LOCK.

1,379,473.  Specification of Letters Patent.  Patented May 24, 1921.

Application filed July 29, 1920, Serial No. 399,780. Renewed April 12, 1921. Serial No. 460,659.

*To all whom it may concern:*

Be it known that I, ORRIN E. G. OLMSTED, a citizen of the United States, residing at Denver, in the county of Denver and State of Colorado, have invented certain new and useful Improvements in Nut-Locks; and I do hereby declare the following to be a full, clear, and exact description of the invention, such as will enable others skilled in the art to which it appertains to make and use the same.

This invention relates to nut locks and more particularly to nut locks operating through coöperation of the nut with a coacting washer and a plate.

The object of the invention is to provide a simple and reliable device of the character indicated which may be applied and removed without special tools and which can be removed as simply and readily as applied.

The invention consists in certain novel structures, arrangement and combinations of parts as hereinafter more specifically described and claimed.

One sheet of drawings accompanies this specification as part thereof in which like reference characters denote like parts throughout.

Figure 1 shows the device applied and with the locking tongue of the washer in locked position, Fig. 2 shows the device applied with the locking tongue of the washer in unlocked position, Fig. 3 shows side and bottom views of the nut, and Figs. 4, 5 and 6 are plan views of suitable forms of washers.

Referring to the drawings, 1 represents an ordinary bolt and 2—2 represent two plates which it is desired to secure together by bolt 1. The nut 3 is provided in its bottom with a plurality of radial ratchet slots of two types. Slots 4 are, for example, as illustrated, twice the depth of slots 5 and slots 5 alternate with slots 4.

The washer 6, of a thickness equal to the depth of slots 5, is slotted radially and one end bent up to form a locking tongue 8 three times the thickness of the washer in length. The part of the washer 7 adjacent the locking tongue 8 for reasons hereinafter made clear, is of spring metal and may be advantageously made narrower as at 7' in Figs. 5 and 6 and for economy of metal, lugs 10—11 may be stamped for centering the washer on the bolt. A notch 9 is cut in the plate adjacent the circumference of the nut and washer as shown in Figs. 1 and 2, this notch being cut with its bottom inclining upward in a counterclock-wise direction for an ordinary right hand threaded bolt as illustrated.

To apply the bolt, the washer is slipped over the threaded end of the bolt with the locking tongue up and the nut screwed down. When the nut engages the tongue the washer turns until locking tongue 8 is above the notch 9 in the plate. As the nut is screwed down farther, the part 7 of the washer is gradually depressed into notch 9 and when the nut is tight will be almost against the inclined bottom of said notch. If now the nut is finally tightened to leave locking tongue 8 in engagement with a shallow slot 5 reversal of the nut 3 is impossible by reason of the fact that tongue 8 being three times the length of the depth of slot 5, one-third of tongue 8 is below the surface of the plate 2 and cannot possibly be elevated above it to unlock.

When it is desired to unlock the bolt, it is only necessary to tighten the nut a fraction of a turn and bring locking tongue 8 into engagement with a deep slot 4. Upon then reversing the nut, spring part 7 of the washer in engagement with the inclined bottom of notch 9 will force locking tongue 8 up into slot 4 the full depth, raising the bottom of the locking tongue clear of the top of plate 2 and permitting continued rotation and removal of the nut.

What I claim is:

1. A nut lock comprising a plate having a bolt hole and a radial notch adjacent thereto, a washer slotted and having an upturned radial locking tongue and a nut having a plurality of radial ratchet slots on its lower face, said slots being alternately and relatively deep and shallow, the locking tongue, notch in the plate and deep and shallow slots in the nut being so proportioned that when said tongue is positioned between the notch and a shallow slot, the nut will be locked, but when positioned between the notch and a deep slot the nut will be unlocked.

2. A nut lock comprising a plate having a bolt hole and a radial notch with an inclined bottom adjacent thereto, a washer slotted and having a radial upturned locking tongue and a nut having a plurality of radial ratchet slots on its lower face, said slots being alternately and relatively deep and shallow, the washer being of a thickness equal to the depth of the shallow slots, the notch in the plate, and the deep slots being twice as deep as the shallow slots and the locking tongue three times as long as the depth of the shallow slots.

3. In a device of the character mentioned, the combination of a non-rotary part, a rotary part, said parts having shouldered notches on their adjacent faces, said ratchet notches on the rotary part being alternately deep and shallow and a spring locking member interposed between said parts adapted to lock said rotary part when engaged with a shallow notch and not to interfere with the rotary part when engaged with a deep notch.

In testimony whereof I affix my signature.

ORRIN E. G. OLMSTED.